United States Patent [19]
Boutaghou et al.

[11] Patent Number: 5,801,894
[45] Date of Patent: Sep. 1, 1998

[54] POWER-SAVING HIGH PERFORMANCE DATA STORAGE SYSTEM

[75] Inventors: Zine-Eddine Boutaghou, Rochester, Minn.; Huey-Ming Tzeng, San Jose, Calif.

[73] Assignee: International Business Machines Corporation, Armonk, N.Y.

[21] Appl. No.: 823,860

[22] Filed: Mar. 25, 1997

Related U.S. Application Data

[63] Continuation of Ser. No. 321,166, Oct. 11, 1994, abandoned.
[51] Int. Cl.$^6$ .............................. G11B 15/18; G11B 21/02
[52] U.S. Cl. ................................................. 360/72.1; 360/75
[58] Field of Search ........................... 360/69, 71, 72.1, 360/75

[56] References Cited

U.S. PATENT DOCUMENTS

| | | | |
|---|---|---|---|
| 4,635,145 | 1/1987 | Horie et al. | 360/69 |
| 4,782,404 | 11/1988 | Baba | 360/77.07 |
| 5,231,549 | 7/1993 | Morehouse et al. | 360/75 |
| 5,303,099 | 4/1994 | Kawazoe | 360/75 |
| 5,345,347 | 9/1994 | Hopkins et al. | 360/71 |

FOREIGN PATENT DOCUMENTS

| | | |
|---|---|---|
| 62-172552 | 7/1987 | Japan . |
| 63-224078 | 9/1988 | Japan . |

OTHER PUBLICATIONS

IBM Technical Disclosure Bulletin, HDA Configuration for Minimum Idle Mode Power by Optimum Read/Write Head Positioning, vol. 36, No. 06A, Jun. 1993, pp. 181–184.

Transactions of the ASME, Journal of Basic Engineering, J.W. Daily and R. E. Nece, Chamber Dimension Effects on Induced Flow and Frictional Resistance of Enclosed Rotating Disks, Mar. 1960, pp. 217–232.

Transactions of the ASME, Journal of Fluids Engineering, A. J. Hudson and P.A. Eibeck, Torque Measurements of Corotating Disks in an Axisymmetric Enclosure, vol. 113, Dec. 1991, pp. 648–653.

American Institute of Physics, J. A. C. Humphrey et al., Analysis of Viscous Dissipation in Disk Storage Systems and Similar Flow Configurations, Phys. Fluids A, vol. 4, No. 7, Jul. 1992, pp. 1415–1427.

*Primary Examiner*—Aristotelis M. Psitos
*Assistant Examiner*—Regina Y. Neal
*Attorney, Agent, or Firm*—Merchant Gould Smith Edell Welter & Schmidt

[57] ABSTRACT

A power-saving high performance data storage system provides for a substantial decrease in power consumption associated with spindle motor rotation during periods of data storage system idleness. A power-saving procedure is preferably executed by a microprocessor coupled to a controller and determines the optimum location to position the head and actuator above and/or below the surface of the data storage disks during idle periods. The power consumed or delivered to the spindle motor and actuator voice coil motor is determined at a plurality of head and actuator locations during the power-up sequence of the data storage system and after the system has reached a steady-state operating temperature. An interpolation procedure may be employed to increase the speed of the power-saving procedure.

20 Claims, 9 Drawing Sheets

| RATIO OF DISK-TO-DISK SPACING TO DISK RADIUS (H/R) | SPINDLE MOTOR POWER (WATTS) |
|---|---|
| 0.03 | 0.16 |
| 0.07 | 0.31 |
| 0.11 | 0.42 |
| 0.23 | 0.55 |
| 0.54 | 0.76 |

FIG. 4

| RATIO OF DISK-TO-DISK SPACING TO DISK RADIUS (H/R) | SPINDLE MOTOR POWER (WATTS) |
|---|---|
| 0.056 | 0.35 |
| 0.069 | 0.17 |
| 0.114 | 0.12 |

FIG. 5

| SPINDLE MOTOR SPEED (RPM) | POWER AT INNER RADIUS ($P_{IR}$) | POWER AT OUTER RADIUS ($P_{OR}$) | $P_{IR} - P_{OR}$ |
|---|---|---|---|
| 4,800 | 3.0 | 3.0 | 0.0 |
| 6,000 | 5.0 | 5.0 | 0.0 |
| 7,200 | 8.5 | 7.4 | 1.1 |
| 9,000 | 16.0 | 14.6 | 1.4 |

FIG. 6

POWER-SAVING HIGH PERFORMANCE DATA STORAGE SYSTEM

This is a Continuation of application Ser. No. 08/321, 166, filed Oct. 11, 1994 now abandoned.

FIELD OF THE INVENTION

The present invention relates generally to data storage systems, and more particularly, to a method and apparatus for minimizing power consumption during periods of data storage system idleness.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute (RPM). Digital information is typically written to and read from the data storage disks by one or more magnetic transducers, each of which is mounted to a slider body. The slider body is generally affixed to a rotatably mounted actuator and configured to minimally impact the airflow pattern produced by the rapidly spinning data storage disks.

The actuator typically includes a plurality of outwardly extending actuator arms, with one or more magnetic read/write transducers and sliders being mounted resiliently or rigidly on the extreme end of the actuator arms. The actuator arms are interleaved into and out of the stack of rotating magnetic disks, typically by means of a coil assembly mounted to the actuator. The coil assembly generally interacts with a permanent magnet structure, and the application of current to the coil assembly in one polarity causes the actuator arms and sliders to shift in one direction, while current of the opposite polarity shifts the actuator arms and sliders in an opposite direction.

In a typical digital data storage system, digital data is stored in the form of magnetic energization on a series of concentric, closely spaced tracks comprising the surface of the magnetizable rigid data storage disks. The tracks are generally divided into a plurality of sectors, with each sector comprising a predefined number of informational fields. One of the informational fields is typically designated for storing data, while other fields contain sector identification and synchronization information, for example. Data is transferred to, and retrieved from, specified track and sector locations by the sliders and transducer heads being shifted from track to track, typically under the control of a controller provided in the data storage system. The transducer head typically includes a read element and a write element.

Writing data to a data storage disk generally involves passing a current through the write element of the transducer head to produce magnetic lines of flux which magnetize a specific location of the disk surface. Reading data from a specified disk location is typically accomplished by a read element of the transducer head sensing the magnetic field or flux lines emanating from the magnetized locations of the disk. As the read element moves over the rotating disk surface, the interaction between the read element and the magnetized locations on the disk surface result in voltage pulses being induced in the read element. The voltage pulses represent transitions in the magnetic field and demarcate the data storing locations of the disk.

The proliferation of the personal computer has resulted in the demand for high performance data storage systems for storing mass volumes of information. Increasing the performance of a data storage system is generally achieved, in part, by increasing the speed at which the spindle motor and data storage disks rotate, thus reducing the time (latency) required to rotate a specific sector on the disk into proximity with the transducer when reading and writing data. Maintaining such high rates of spindle motor and disk rotation typically requires the application of an appreciable amount of power to the data storage system. The aggregate effect of increased power consumption by personal computers and data storage systems in the United States has led the Environmental Protection Agency to promulgate guidelines which require personal computer manufacturers to reduce the power usage of personal computers.

Many power-saving schemes have been employed to reduce the overall power consumption of data storage systems. It is generally understood by those skilled in the art that the spindle motor consumes a disproportionate amount of power in comparison to other components of the data storage system. Further, most data storage systems remain substantially idle for extended periods of time during which the computer system performs tasks not requiring access to the data storage system or awaits interaction with a user of the computer system. Such periods of data storage system idleness can comprise up to 80 to 90 percent of total operating time. One known approach for reducing the amount of power consumed by a data storage system concerns the selective powering-off of various system components when such systems are not currently utilized. When needed, the effected system is energized and activated for normal operation. In view of the disproportionate amount of power consumed by the spindle motor, the temporary powering-off of other system components is not considered advantageous.

Another power-management scheme involves de-energizing the spindle motor during periods of data storage system inactivity. Stopping or substantially reducing the rotational speed of the spindle motor and data storage disks during normal computer system usage is generally considered problematic for a number of reasons. The amount of current required to initiate spindle motor rotation is typically twice that required to maintain the data storage disks at a desired constant rate of rotation during normal operation, thus resulting in increased power consumption. Further, a typical data storage system requires several minutes of operation in order to reach and maintain a thermally stable state of operation. Also, frequent contact between the sliders and the data storage disks resulting from significantly reducing the rate of motor spindle rotation can significantly reduce the service life of the data storage disks. Moreover, the substantial time delay associated with powering the spindle motor to reach the operational rate of rotation is generally unacceptable in high performance data storage systems.

Another known power-reduction technique involves maintaining the spindle motor at a constant operational rate of rotation and positioning the sliders and transducers nearest the inner diameter of the disks during periods of extended data storage system idleness. In a Technical Disclosure Bulletin entitled "HDA Configuration for Minimum Idle Mode Power by Optimum Read/Write Head Positioning," published in Volume 36, No. 06A on June 1993 by International Business Machines (IBM) Corporation, assignee of the present application, a reduction in data storage system power usage was reported when positioning the read/write heads close to the inner diameter of the data storage disks during periods of data storage system idleness. The IBM Technical Disclosure Bulletin, however, is limited to an analysis of a data storage system configured to operate at a design speed of only approximately 3,600 RPM. The analysis presented in the IBM Bulletin addresses only the negative influence of aerodynamic drag resulting from the read/write heads being in close proximity with the rotating disks, and ignores other important factors that significantly impact power consumption of the spindle motor. Such other factors become increasingly pronounced in high performance data storage systems as the operating rate of the spindle motor is increased to speeds on the order of 7,000 to 10,000 RPM.

There exists a need in the data storage system manufacturing industry for a method and apparatus for minimizing the power consumed by high performance data storage systems. There exists the further need to provide a power-saving data storage system that optimizes power consumption as the operating conditions within the data storage system housing change. The present invention fulfills these and other needs.

SUMMARY OF THE INVENTION

The present invention is an apparatus and method for reducing the power consumed by a data storage system during periods of system idleness. The power consumed or delivered to the spindle motor, or alternatively, the spindle motor and the actuator voice coil motor, is determined at a plurality of actuator locations across the data storage disks. A power-saving procedure is preferably executed by a microprocessor coupled to a controller that determines the optimum disk location to position the actuator during idle periods. The power-saving procedure may be executed during the power-up sequence of the data storage system and after the system has reached a steady-state ambient operating temperature. An interpolation procedure may be employed to increase the speed of the power-saving procedure.

BRIEF DESCRIPTION OF THE DRAWINGS

FIG. 4 is a table of empirical data illustrating the relationship of spindle motor power consumption as a function of the spacing distance between adjacent co-rotating data storage disks; where the actuator arm is positioned outside the perimeter of the data storage disks;

FIG. 5 is a table of empirical data illustrating the relationship of spindle motor power consumption as a function of the spacing distance between adjacent co-rotating data storage disks, where the actuator arm is positioned between the rotating data storage disks;

FIG. 6 is a table of empirical data describing the relationship of spindle motor power consumption as a function of the power consumed as a function of actuator position for slider and actuator arm position within the stack of co-rotating data storage disks;

DETAILED DESCRIPTION OF THE PREFERRED EMBODIMENTS

Figure 1:
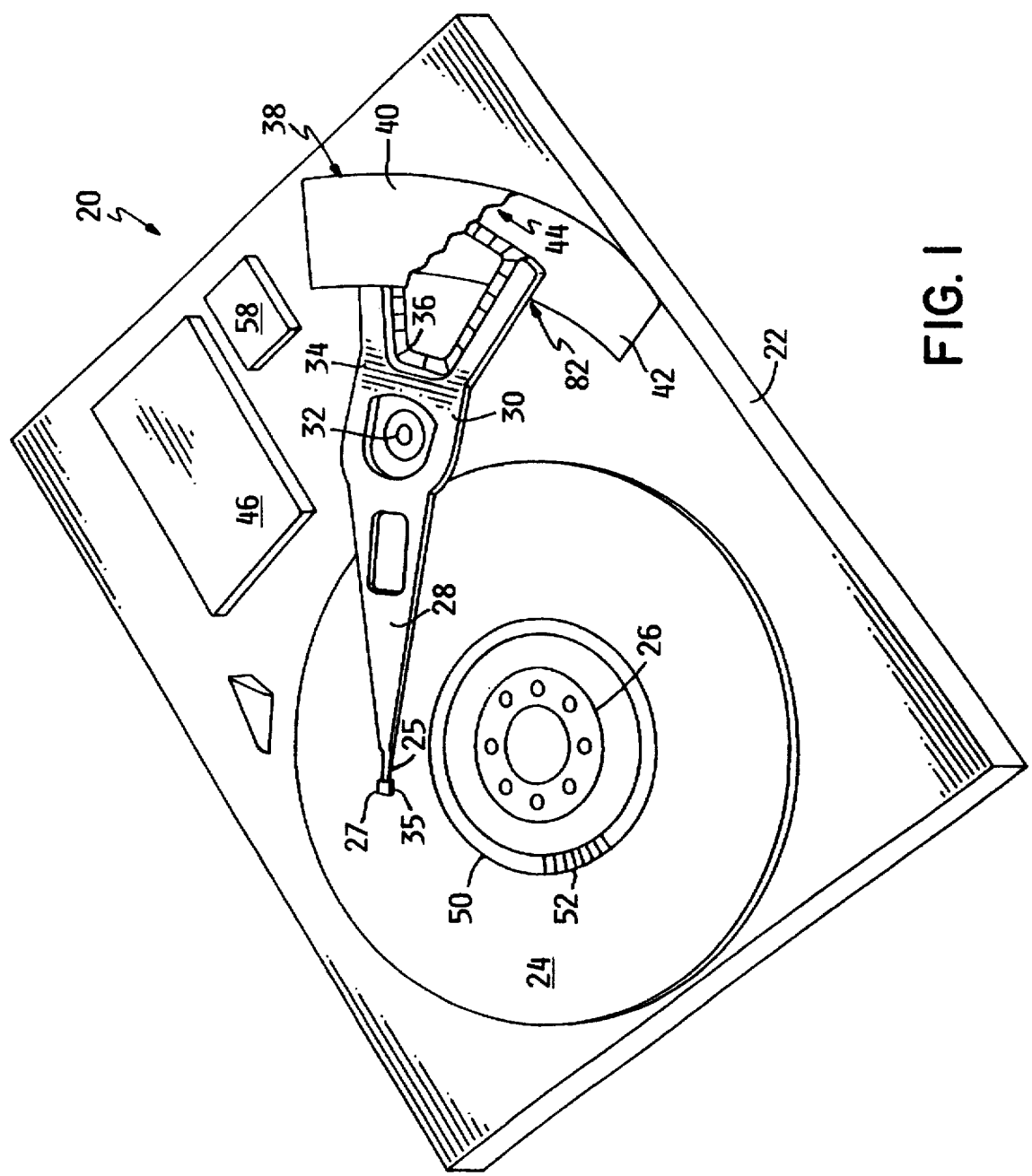
FIG. 1 is a top perspective view of a data storage system with its upper housing cover removed.
Figure 2:
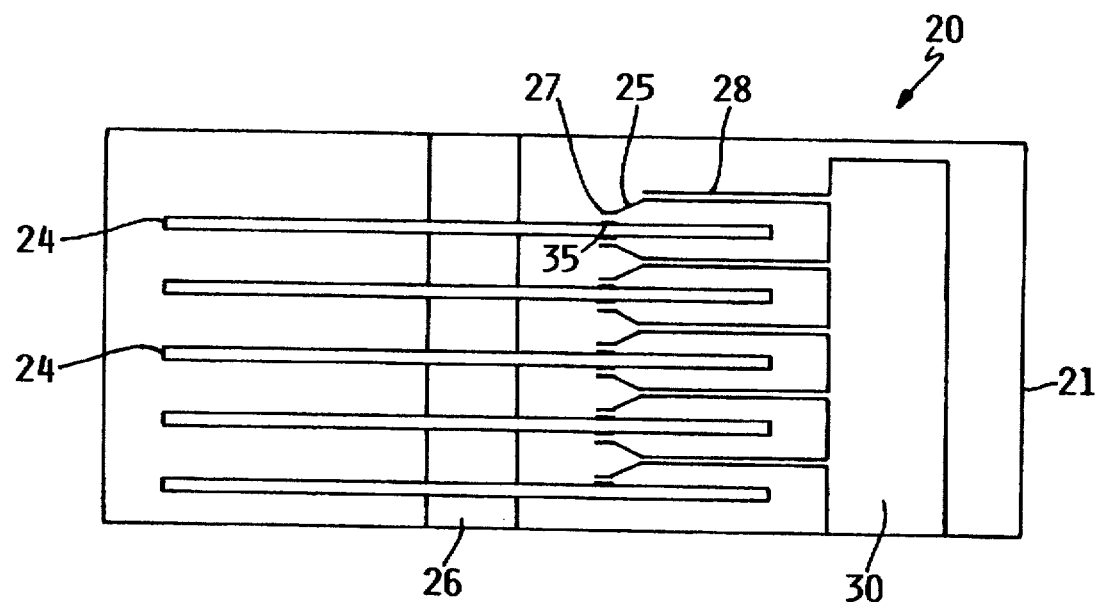
FIG. 2 is a side plan view of a data storage system comprising a plurality of data storage disks.

Referring now to the drawings, and more particularly to FIGS. 1 and 2, there is shown a data storage system 20 having one or more rigid data storage disks 24 stacked coaxially in a tandem spaced relationship which rotate about a common spindle motor 26 at a relatively high rate of rotation. Each disk is preferably formatted to included a plurality of spaced concentric tracks 50, with each track being partitioned into a series of sectors 52.

An actuator 30 typically includes a plurality of interleaved actuator arms 28, with each arm having at least one magnetic transducer 35 mounted to a slider 27 for reading and writing information magnetically onto the data storage disks 24. The actuator 30 is usually mounted to a stationary actuator shaft 32, and rotates thereon to move the actuator arms 28 and sliders 27 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28 and sliders 27 to sweep over the surfaces of the data storage disks 24. The spindle motor 26 typically comprises a three-phase a.c. motor energized by a stepping power supply 46 for rotating the data storage disks 24.

The coil assembly 36 and the upper and lower magnet assemblies 40 and 42 of the permanent magnet structure 38 operate in cooperation as an actuator voice coil motor (VCM) 82 responsive to control signals produced by a controller 58. The actuator VCM 82 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 and sliders 27 in directions dependent on the polarity of the control currents flowing in the coil assembly 36. A controller 58 preferably includes control circuitry that coordinates the transfer of data to and from the data storage disks 24, and cooperates with the actuator VCM 82 to move the actuator arms 28, sliders 27, and transducers 35 to prescribed track 50 and sector 52 locations when reading and writing data to the disks 24.

Figure 3:
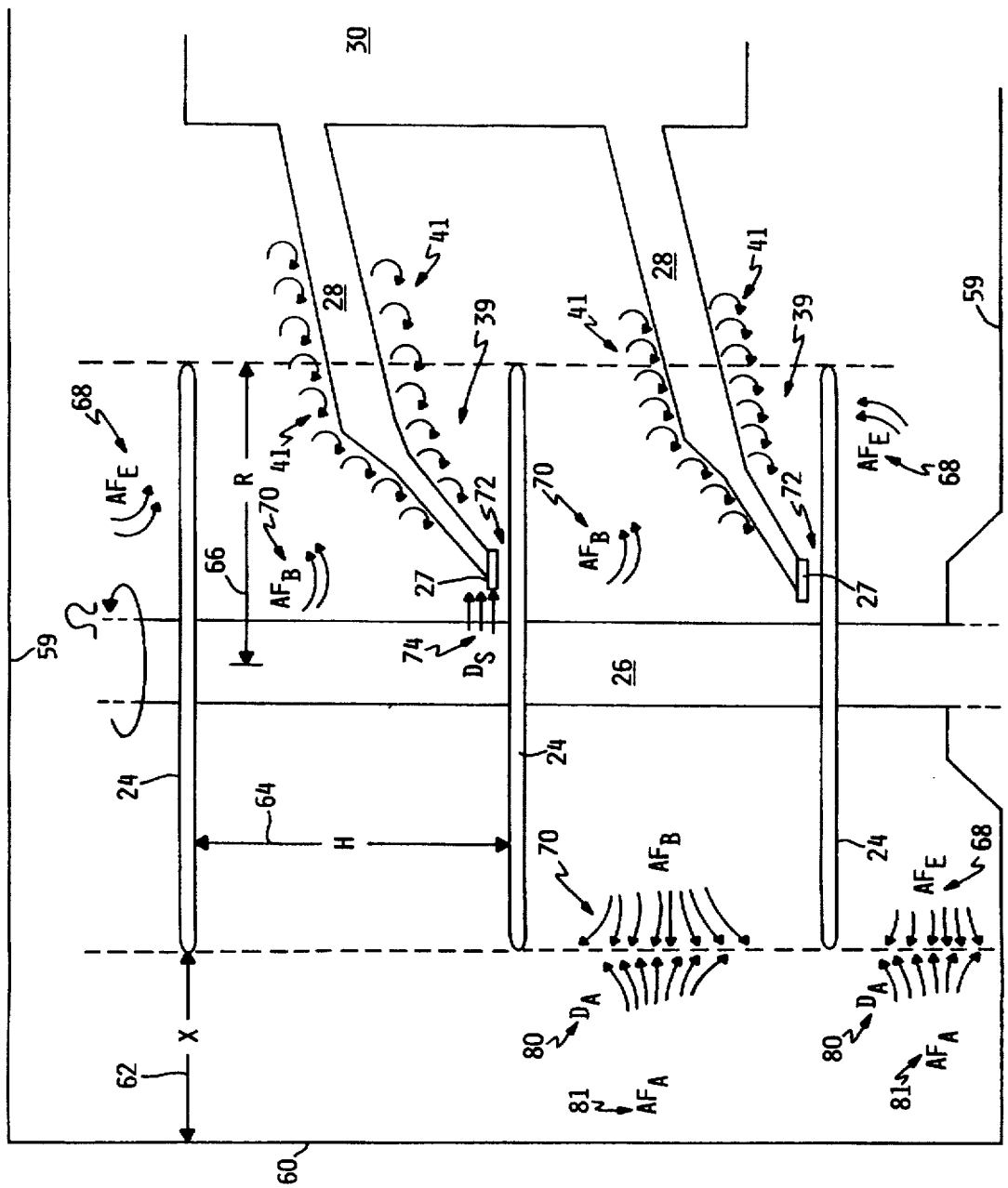
FIG. 3 is an exaggerated illustration of the interior of a data storage system housing, with a plurality of data storage disks mounted to a spindle motor that rotates the disks at a relatively high rate of rotation.

Turning now to FIG. 3, there is shown an exaggerated illustration of the interior of a data storage system 20 having a plurality of data storage disks 24 mounted coaxially about a spindle motor 26. An actuator 30 includes a plurality of actuator arms 28 with sliders 27 mounted on the end of the actuator arms 28. Each slider 27 preferably includes at least one transducer 35 for reading and writing data to the disk 24. The slider 27 is typically designed as an aerodynamic lifting body that lifts the transducer 35 off the surface of the disk 24 as the rate of spindle motor 26 rotation increases, and causes the transducer 35 to hover above the disk 24 on an air bearing 72 produced by the airflow patterns generated from high-speed disk rotation.

Electrical power is supplied to the spindle motor 26 to maintain the data storage disks 24 at a constant rate of rotation, and to overcome various drag forces produced within the data storage system housing 21. It has been determined that operating the spindle motor 26 at relatively high rates of rotation, typically in excess of 7,000 RPM for example, results in the production of various viscous drag forces heretofore unappreciated and unaddressed in prior art power-saving techniques. As the desire for high performance data storage systems and high disk 24 speeds continues to increase, these drag forces become increasingly pronounced, resulting in a significant increase in the amount of power consumed by the data storage system 20. The present invention provides for a substantial reduction in the amount of power required to operate a data storage system 20 during idle periods by adaptively modifying the optimum idle position of the sliders 27 and actuator arms 28 in response to various drag forces exerted on both the disk stack 24 and the actuator arm 28 assembly which negatively impact the efficiency of the spindle motor 26. It is noted that the various drag forces associated with spindle motor 26 and data storage disk 24 rotation change in character over time due to fluctuations in the ambient temperature within the data storage system housing 21.

As further illustrated in FIG. 3, the spindle motor 26 is depicted as rotating at a design speed omega ($\Omega$), preferably between a range of 7,000 and 10,000 RPM. It is to be understood, however, that the advantages of the present invention are realizable for rotational rates less than or greater than this range. The rotation of the stack of data storage disks 24 and spindle motor 26 produces airflow patterns above, below, and surrounding the disks 24. These airflow patterns are significantly disturbed when they interact with ambient air within the housing 21 in proximity with the disk stack 24, and the relatively static slider 27 and actuator arm 28 structures interleaving into and out of the disk stack 24. The airflow perturbations produce various viscous drag forces which can be generally categorized as drag forces associated with the disk stack 24, and those associated with the slider 27 and actuator arm 28 assembly, hereinafter referred to in combination as the slider/arm assembly 39. These drag forces generally increase in magnitude as the speed of disk 24 rotation increases, and cause the spindle motor 26 to consume additional power.

The introduction of the slider/arm assembly 39 into the disk stack 24 results in additional spindle motor 26 power consumption needed to overcome drag forces produced under the airbearing surface of the slider 27, and by the obstruction of the airflow pattern between the co-rotating disks 24. A shear drag force $D_S$ 74 is created between the slider 27 and the surface of the disk 24 as the airflow produced by the spinning disk 24 impinges on the slider 27. The slider 27 is typically designed to exhibit a low coefficient of friction, and configured to lift the transducer to a stable hovering position in close proximity with the rotating disk surface 24. It has been determined that the magnitude of the shear drag force $D_S$ 74 negatively impacting the rotation of the spindle motor 26 can be generally characterized by the equation $D_S = (\Omega^* R)^{1.5}$, where $\Omega$ is the rotational rate of the disk 24, and R is the radial location of the slider 27 along the disk 24 with respect to the center of the disk 24.

This equation generally indicates that the slider 27 related power consumption is minimal at an inner radial disk 24 location. It is noted that the undesirable viscous drag force $D_S$ 74 associated with the slider 27 is understood to be substantially independent of the geometry or configuration of the disk stack 24, and is strongly dependent on the design of the slider 27. It is further noted, as discussed in detail below, that the prior art technique of positioning the read/write heads or sliders 27 at an inner diameter of the disk 24 to achieve minimal power usage during idle periods generally takes into consideration only the shear drag force $D_S$ 74 created at the head-disk interface, and fails to account for the significant impact on power consumption associated with the perturbation of airflow patterns 41 caused by the actuator arm 28 and airshear drag forces 80 created between the rotating disk stack 24 and the ambient air within the data storage system housing 21. To the extent that these other considerations are not accounted for, the prior art solution is considered unavailing.

The rotation of the stack of disks 24 induces airflow patterns of varying characteristics within the data storage system housing 21, or more specifically, within the portion of the housing surrounding the disk stack 24. In general, the bulk fluid or air surrounding the disks 24 moves at a slower rate than the rotating disks 24. This difference in fluid velocities creates a shear drag force $D_A$ 80 that slows down the spindle motor 26, and must be counteracted by the application of additional power to the spindle motor 26 to maintain the stack of disks 24 at a constant rate of rotation. The airshear drag forces $D_A$ 80 are generally understood to be a function of the configuration of the stack of disks 24 and the dynamic conditions within the housing 21. The parameters affecting the characteristics of the airshear drag forces $D_A$ 80 include: the diameter of the disks, which is equivalent to twice the length of the disk radius R 66; the disk-to-disk spacing H 64; the disk-to-shroud distance X 62, typically a stationary structure 60 of the housing 21 surrounding all or a portion of the disk stack 24; and the rotational speed $\Omega$ of the disks 24.

The geometry and rotation of the disk stack 24 produce essentially two types of airflow patterns within the data storage system housing 21. The first pattern, designated at $AF_E$ 68, is associated with the airflow respectively between the end plates 59 and the adjacent uppermost and lowermost disks comprising the disk stack 24, and exhibits little dependence on the disk stack 24 geometry. The second pattern, designated as $AF_B$ 70, is associated with airflow between the co-rotating disks 24, and is strongly influenced by the configuration of the disk stack 24. The relatively fast moving airflow patterns $AF_E$ 68 and $AF_B$ 70 typically interact with ambient airflow patterns $AF_A$ 81 of lower velocity to create shear drag forces $D_A$ 80 that adversely affect the rotation of the disks 24 and spindle motor 26.

As illustrated in the empirical data tabulated in FIG. 4, for example, the spacing H 64 between co-rotating disks 24 significantly impacts the power consumed by the spindle motor 26. It is noted that the tabulated data in FIG. 4 was derived with the actuator arms 28 positioned beyond the outer diameter of the disk stack 24. The amount of power consumed by the spindle motor 26 needed to maintain the disks 24 at a constant rate of rotation monotonically increases as the spacing between adjacently stacked disks 24 increases. As the disk spacing, measured as the ratio (H/R) of the disk-to-disk spacing H 64 to the radius R 66 of the disk 24, is decreased, a concomitant reduction in the power consumed by the spindle motor 26 is realized. A least-squares fit to the tabulated data presented in FIG. 4 indicates that the net effect of the spacing H 64 between co-rotating disks on spindle motor 26 power consumption is proportional to the ratio of $H/R^{0.53}$. As the demand for higher storage capacity data storage systems 20 increases, the spacing H 64 between adjacently stacked disks 24 will likely continue to decrease. Although the empirical data tabulated in FIG. 4 would suggest that closer disk spacing is desirable for minimizing spindle motor 26 power consumption, the impact of slider/arm assembly 39 obstruction within the airflow pattern $AF_B$ 70 must also be accounted for when designing a power-saving high performance data storage system 20.

The disruption of the airflow pattern $AF_B$ 70 resulting from introducing the slider/arm assembly 39 into the disk stack 24, a phenomenon heretofore unaddressed by prior art power-saving schemes, globally alters the flow of air within the housing 21 and causes the spindle motor 26 to draw additional power to maintain a constant rate of rotation. When the slider/arm assembly 39 is positioned between the disks of the disk stack 24, a wake region 41 is created behind the slider/arm assembly 39 which dramatically alters the airflow $AF_B$ 70 between the co-rotating disks 24. The relationship between the magnitude of the obstruction caused by the slider/arm assembly 39 being positioned at an inner radial disk location and the power consumed by the spindle motor 26 to counteract the resulting reduction in disk rotation speed is illustrated in FIG. 5. It is noted that the thickness or vertical dimension of the actuator arm 28 was not varied when the empirical data tabulated in FIG. 5 was obtained. As the disk-to-disk spacing H 62 is decreased for a disk 24 of fixed radius R, the disruptive effects of the slider/arm assembly 39 are intensified. By reducing the spacing H 62 between adjacently stacked disks 24 by one-half (H/R ratio reduced from 0.114 to 0.056), a threefold increase in spindle motor 26 power consumption is needed to maintain a constant rate of disk 24 rotation. The empirical data tabulated in FIG. 5 thus suggests that spindle motor 26 power consumption increases greatly as the thickness of the slider/arm assembly 39 approaches the size of the disk-to-disk spacing H 62.

Further, the magnitude of the deleterious effects of the obstruction to the airflow $AF_B$ 70 between the co-rotating disks 24 is understood to be dependent on the radial location of the slider/arm assembly 39 within the disk stack 24. As illustrated in FIG. 6, the power consumed by the spindle motor 26 increases as the slider/arm assembly 39 is positioned progressively toward the inner disk 24 diameter. The additional power needed to maintain the disks 24 at a constant rate of rotation when the slider/arm assembly 39 is positioned at inner radial disk locations is attributed to the disruption of the co-rotating airflow between the disks 24 and the formation of a stronger and larger wake region 41 behind the slider/arm assembly 39 as the slider/arm assembly 39 penetrates further into the disk stack 24. As the speed of the spindle motor 26 increases, the disparity between power consumption values at inner and outer radii of the disk 24 becomes more pronounced. At 9,000 RPM, for example, a 10 percent reduction in spindle motor 26 power consumption is realized by positioning the slider/arm assembly 39 near the outer radius of the disk 24 in comparison with positioning the slider/arm assembly 39 near the inner disk radius. In contrast to the suggested solution of prior art power-saving schemes, minimizing spindle motor 26 power consumption may be realized by positioning the slider 27 at an outer, rather than inner, diameter of the disk 24 during periods of data storage system 20 idleness.

Figure 7:
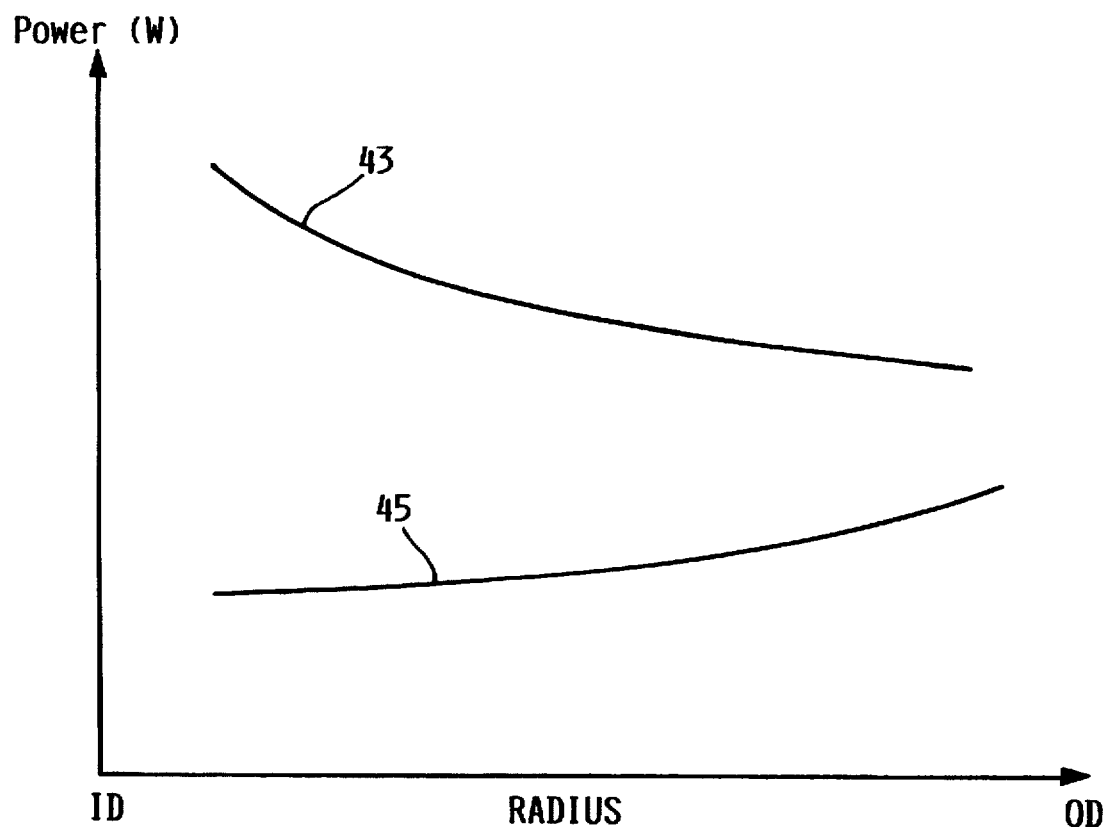
FIG. 7 is a graphical depiction of two data storage systems having dissimilar optimum disk locations for positioning the slider and actuator arm during periods of data storage system idleness.

The dependency of spindle motor 26 power consumption on the radial location of the slider/arm assembly 39 within the disk stack 24 is illustrated in FIG. 7. The two curves 43 and 45 illustrated in the Power versus Disk Radius Location graph reveal that the disk stack 24 geometry and dynamic operating conditions of the data storage system 20 dramatically impact the optimum slider/actuator assembly 39 location for minimizing spindle motor 26 power consumption during periods of data storage system 20 idleness. The upper curve 43 depicts the spindle motor 26 power consumption curve for a data storage system configuration 20 in which the negative effects of slider/arm assembly 39 airflow obstruction dominate the effects of viscous drag forces $D_S$ 74 produced between the slider 27 and the surface of the disk 24. In such a configuration, moving the slider/arm assembly 39 to an outer radius of the disk 24 during idle periods minimizes the power consumed by the spindle motor 26. The lower curve 45, in contrast, illustrates the spindle motor 26 power consumption characteristics of a data storage system configuration 20 in which the effects of the viscous drag forces $D_S$ 74 dominate the negative effects of slider/arm assembly 39 airflow obstruction. Accordingly, the slider/arm assembly 39 should be positioned at an inner disk 24 radius to minimizes the power consumed by the spindle motor 26 during periods of data storage system 20 idleness.

It can be readily appreciated that the profusion and diversity of data storage system configurations and operating conditions preclude adoption of a simple guideline specifying a single optimum location for positioning the slider/arm assembly 39 during idle periods to minimize spindle motor 26 power consumption. It can also be appreciated that the viscous drag forces and airflow perturbations affecting spindle motor 26 power consumption change in character and magnitude of effect as the temperature within the data storage system housing 21 changes. An initially optimum idle mode slider/arm assembly 39 location, for example, may no longer provide maximum power conservation as the temperature of the ambient air and data storage system components increase and change over time. The novel power-saving high performance disk drive of the present invention determines the optimum location of the slider/arm assembly 39 during idle mode periods for data storage systems having differing configurations and operating environments.

Figure 8:
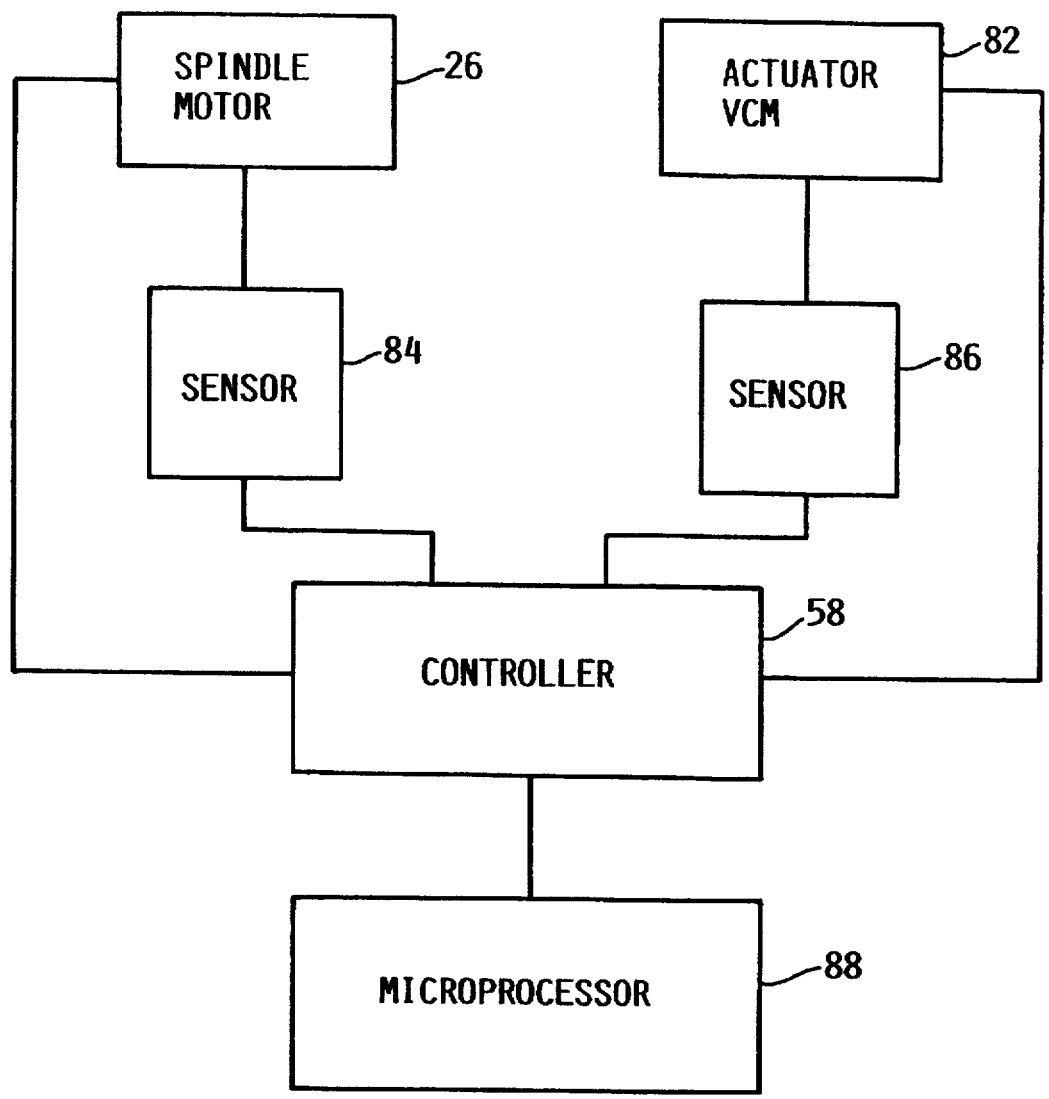
FIG. 8 is a generalized block diagram of the various components employed to effectuate a substantial reduction in the power consumed by a high performance data storage system.

In the embodiment illustrated in FIG. 8, the spindle motor 26 is coupled to a controller 58. The controller 58 preferably produces control signals that cause a stepping power supply 46 to rotate the spindle motor 26 at a predefined operating speed. A sensor 84 is preferably coupled to the spindle motor 26 and the controller 58, and senses a parameter of the power delivered to, or, alternatively, consumed by the spindle motor 26. The power parameter is preferably the current delivered to the spindle motor 26. Alternatively, the average power delivered to or consumed by the spindle motor 26 may be derived from knowledge of the source voltage and current.

In another embodiment, the controller 58 is coupled to both the spindle motor 26 and the actuator VCM 82. A sensor 86 is preferably employed to sense a power parameter associated with the operation of the actuator VCM 82, typically the current or average power delivered or consumed by the actuator VCM 82. The output signals of the sensors 84 and 86 are preferably communicated to the controller 58. A microprocessor 88 is preferably coupled to the controller 58 for storing and executing the various functions and procedures performed by the controller 58.

In yet another embodiment, the microprocessor 88, or other control device coupled to the controller 58, preferably issues a digital power instruction corresponding to the amount of power to be applied to the spindle motor 26 to maintain a specified rate of rotation. Rather than employ sensors 84 and 86, a power parameter corresponding to the amount of power delivered to the spindle motor 26 may be derived from the digital power instruction issued by the microprocessor 88. The control current, for example, needed to maintain the spindle motor 26 at a specified rate of rotation may be derived from a current control instruction issued by the microprocessor 88. The power delivered to the spindle motor 26 may then be computed from the control current instruction issued by the microprocessor 88 and the voltage provided by the spindle motor 26 voltage source.

Figure 9:
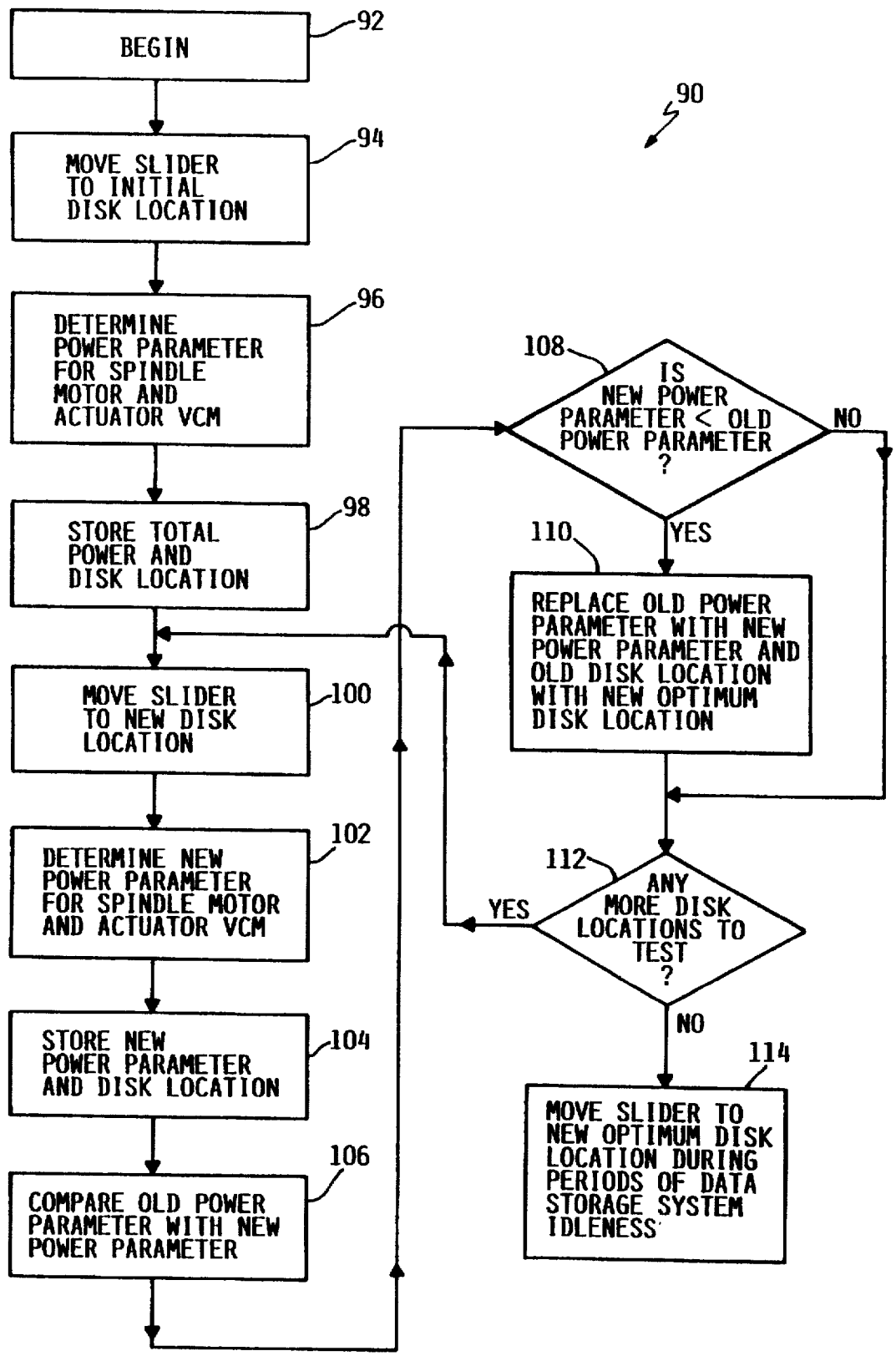
FIG. 9 is a generalized flow diagram of the process steps for implementing a power-saving procedure in novel power-saving high performance data storage system.

The microprocessor 88, in one embodiment, preferably includes microcode for executing a novel power-saving procedure 90 as illustrated in FIG. 9. The power-saving procedure 90 is preferably executed during the power-up sequence when power is initially applied to the data storage system 20 and the spindle motor 26 is rotating at the predetermined rate of rotation. Optimum spindle motor 26 power conservation during normal data storage system 20 operation may be realized by re-executing the novel power-saving procedure 90 on one or more occasions during idle periods as operating conditions change. The power-saving procedure 90 is initiated at step 92, and begins with moving the slider 27 to an initial radial location on the disk 24 at step 94. The initial location may be an inner radial location, an outer radial location, or any other location on the disk 24. It is noted that the slider 27 and actuator arm 28 are moved together in concert when the slider 27 is positioned at various radial locations on the disk 24.

At step 96, power parameters of the spindle motor 26 and actuator VCM 82 are respectively sensed by sensors 84 and 86, and a power parameter indicative of the total power delivered to, or consumed by, the spindle motor 26 and actuator VCM 82 is determined. Alternatively, the power parameters for the spindle motor 26 and actuator VCM 82 may be derived from digital power instructions issued by the microprocessor 88. For simplicity of explanation, the power parameter sensed and determined will be referred to as a measure of delivered power. The parameter indicative of the total delivered power, as well as the associated disk location address, is then stored in the microprocessor 88 at step 98. It is understood that the controller 58 or other storage device may be employed to store the delivered power parameter at step 98. The slider 27 is then moved to a new location on the disk 24 at step 100. It may be desirable to initially locate the slider 27 at either one of the extreme inner or outer radial locations on the disk 24, and then incrementally move the slider 27 progressively across the disk 24 until most or all of the disk surface 24 has been traversed.

With the slider 27 positioned at the new radial disk location, the delivered power parameters of the spindle motor 26 and actuator VCM 82 are again respectively sensed by sensors 84 and 86 or derived from microprocessor 88 power control instructions, and the power parameter indicative of the total power delivered to the spindle motor 26 and actuator VCM 82 is determined at step 102. The new total delivered power parameter and associated disk location address is then stored in the microprocessor at step 104. At step 106, the previously stored total delivered power parameter, referred to as the old power parameter, is compared to the new power parameter. If the new power parameter, at step 108, is reflective of a lower amount of spindle motor 26 and actuator VCM 82 power consumption in comparison to the old power parameter, the old power parameter is replaced with the new power parameter in the microprocessor 88 at step 110. The old power parameter is retained in the microprocessor memory 88 at step 110 if the new power parameter represents a higher amount of spindle motor 26 and actuator VCM 82 power consumption in comparison to the old power parameter.

If, at step 112, additional disk 24 locations are to be tested, the slider 27 is moved to a new disk 24 location at step 100, and steps 102, 104, 106, 108 and 110 are repeated. The power parameter retained in the microprocessor memory 88 after completion of the moving, determination, and comparison steps represents the lowest power consumption value for the plurality of locations tested over the disk 24. During periods of data storage system inactivity, or more specifically, periods of actuator idleness, the actuator is moved to the optimum power-saving location on the disk associated with the lowest power consumption parameter at step 114. The power-saving procedure 90 is preferably executed during normal data storage system 20 operation in order to optimize spindle motor 26 power conservation. It is noted that the power-saving procedure 90 need not include an analysis of the actuator VCM power consumption, but may instead be directed exclusively to the power delivered or consumed by the spindle motor 26.

In another embodiment, the testing and determining of delivered power at discrete disk 24 locations may instead be modified or replaced by an interpolation methodology. A few disk locations, typically at an inner, outer, and intermediate radial location, may be selected for performing the delivered power determinations. A known interpolation computation may then be performed, such as a least-squares fit or polynomial approximation, to determine the optimum location for positioning the slider 27 and actuator 28 during periods of data storage system 20 idleness.

In an alternative embodiment, a power-saving procedure 90 may be employed for determining optimum actuator 30 positioning during read/write transducer 35 inactivity, or actuator 30 idleness, by a data storage system 20 manufacturer as part of a final testing process. Prior to shipping a data storage system 20 for commercial use or sale, the system 20 is preferably operated for a period of time sufficient to ensure that the system 20 has reached a steady-state operating temperature. The power-saving procedure 90 may then be executed one or more times, and an optimum idle mode actuator 30 position may then be established. This optimum actuator 30 position is preferably hard-coded or written into the firmware of the controller 58. During normal data storage system 20 usage by an end-user, the actuator 30 preferably returns to the previously stored or hard-coded optimum actuator 30 position during periods of actuator 30 idleness. In this embodiment, the various steps of the power-saving procedure 90 need not be dynamically performed during normal operation of the data storage system 20 after the system 20 leaves the manufacturing facility. Although not required, the power-saving procedure 90 may be re-executed during subsequent normal usage by an end-user in order to further optimize the power consumed by the data storage system 20.

It will, of course, be understood that various modifications and additions can be made to the embodiments discussed hereinabove without departing from the scope or spirit of the present invention. The power-saving procedure 90 and apparatus, for example, may be employed in systems having rotating media other than magnetic storage disks, such as CD-ROMs and optical disks. Accordingly, the scope of the present invention should not be limited by the particular embodiments discussed above, but should be defined only by the claims set forth below and equivalents of the embodiments described above.

What is claimed is:

1. A method of minimizing power consumption performed by a data storage device enclosed by a housing and having a data storage disk for storing data mounted to a spindle motor for rotating the data storage disk, a transducer for transferring data to and from the disk, an actuator and actuator motor for moving the transducer across the disk, a controller for coordinating the transfer of data to and from the disk, the method of minimizing the power consumption comprising the steps of:

rotating the data storage disk so as to create airflow patterns within the housing, wherein the data storage disk is subjected to an air shear force, resulting from the airflow patterns, which dominates viscous drag forces between the transducer and the disk;

moving the actuator to a plurality of locations over the data storage disk, wherein the actuator location changes the air shear force acting on the data storage disk;

determining a parameter indicative of the power consumed by the spindle motor at each of the plurality of data storage disk locations;

establishing a target data storage disk location associated with a minimum amount of power consumed by the spindle motor, the minimum amount of power consumed by the spindle motor being determined using the plurality of power consumption parameters; and positioning the actuator at the target data storage disk location during periods of actuator idleness, thereby minimizing the contribution of the air shear force to the power consumption of the spindle motor.

2. A method as claimed in claim 1, wherein the step of determining a parameter indicative of the power consumed by the spindle motor includes the step of determining the current delivered to the spindle motor at each of the plurality of data storage disk locations.

3. A method as claimed in claim 1, wherein:

the method of minimizing power includes the step of storing the target data storage disk location; and the actuator positioning step includes the step of reading the stored target storage disk location to position the actuator at the target data storage disk location during periods of actuator idleness.

4. A method as claimed in claim 1, wherein the moving, determining, and establishing steps are performed substantially at the time of data storage device manufacture, and the actuator positioning step is performed after manufacture during normal data storage device usage.

5. A method as claimed in claim 1, wherein the step of establishing the target data storage disk location includes the step of interpolating the plurality of power consumption parameters.

6. A method as claimed in claim 1, wherein the step of establishing the target data storage disk location includes the step of comparing the determined spindle motor power consumption parameters to determine the target data storage disk location associated with a minimum amount of power consumed by the spindle motor.

7. A method as claimed in claim 1, further including the step of reestablishing a target data storage disk location during a period of actuator idleness.

8. A method as claimed in claim 1, wherein the data storage disk is rotated at speeds greater than 5,000 revolutions per minute.

9. A method as claimed in claim 1, wherein the actuator includes an actuator arm and the moving step includes moving the actuator arm to a plurality of locations on the data storage disk, wherein the movement of the actuator arm perturbs the airflow patterns and wherein the actuator arm location changes the force acting on the data storage disk.

10. A method of minimizing power consumption of a data storage device having a data storage disk for storing data mounted to a spindle motor for rotating the data storage disk, a transducer for transferring data to and from the disk, an actuator and actuator motor for moving the transducer across the disk, and a controller for coordinating the transfer of data to and from the disk, the method of minimizing power consumption comprising the steps of:

rotating the data storage disk so as to create airflow patterns within the housing, wherein the data storage disk is subjected to an air shear force, resulting from the airflow patterns, which dominates viscous drag forces between the transducer and the disk;

moving the actuator to a plurality of locations over the data storage disk, wherein the actuator location changes the air shear force acting on the data storage disk;

determining a parameter indicative of the power consumed by the spindle motor and the actuator motor at each of the plurality of data storage disk locations;

establishing from the plurality of power consumption parameters a target data storage disk location associated with a minimum amount of power consumed by the spindle motor and the actuator motor; and positioning the actuator at the target data storage disk location during periods of actuator idleness, thereby minimizing the contribution of the air shear force to the power consumption of the spindle motor and actuator motor.

11. A method as claimed in claim 10, wherein the step of determining a parameter indicative of the power consumed by the spindle motor and actuator motor includes the step of determining the current delivered to the spindle motor and actuator motor at each of the plurality of data storage disk locations.

12. A system for minimizing power consumption of a data storage system enclosed in a housing, the data storage system having a data storage disk for storing data mounted to a spindle motor for rotating the data storage disk, a transducer for transferring data and from the disk, an actuator and actuator motor for moving the transducer across the disk, and a controller for coordinating the transfer of data to and from the disk, the system for minimizing power consumption comprising:

means for rotating the data storage disk so as to create airflow patterns within the housing, wherein the data storage disk is subjected to an air shear forces resulting from the airflow patterns, which dominates viscous drag forces between the transducer and the disk;

controller means for controlling the movement of the actuator to a plurality of locations on the data storage disk, wherein the actuator location changes the air shear force acting on the data storage disk;

determining means for determining a power consumption parameter indicative of the power consumed by the spindle motor at each of the plurality of data storage disk locations; and establishing means for establishing from the plurality of power consumption parameters a target data storage disk location on the data storage disk associated with a minimum amount of power consumed by the spindle motor;

wherein the actuator, under the control of the controller means, is positioned at the target data storage disk location during periods of actuator idleness, thereby minimizing the contribution of the air shear force to the power consumption of the spindle motor.

13. A system as claimed in claim 12, wherein the power consumption parameter is indicative of the power consumed by the spindle motor and actuator motor at each of the plurality of data storage disk locations; and the target data storage disk location on the data storage disk is associated with a minimum amount of power consumed by the spindle motor and the actuator motor.

14. A system as claimed in claim 12, wherein the controller means comprises memory means for storing the plurality of power consumption parameters.

15. A system as claimed in claim 12, wherein the establishing means comprises a microprocessor, the microprocessor cooperating with the storing means to determine the target data storage disk location associated with a minimum amount of power consumed by the spindle motor.

16. A system for storing data comprising:

a housing enclosing the system;

a data storage disk;

a spindle motor mounted to the housing and adapted for rotating the data storage disk so as to create airflow patterns within the housing, wherein the data storage disk is subjected to an air shear force resulting from the airflow patterns, which dominates viscous drag forces between the transducer and the disk;

an actuator movably mounted to the housing;

a transducer mounted to the actuator; and a circuit for minimizing spindle motor power consumption comprising;

controller means for controlling the movement of the actuator to a plurality of locations over the data storage disk, wherein the actuator location changes the air shear force acting on the data storage disk;

determining means for determining a power consumption parameter indicative of the power consumed by the spindle motor at each of the plurality of data storage disk locations;

storing means for storing the power consumption parameters; and establishing means for establishing from the plurality of stored power consumption parameters a target data storage disk location on the data storage disk associated with a minimum amount of power consumed by the spindle motor;

wherein the actuator, under the control of the controller means, is positioned at the target data storage disk location during periods of actuator idleness, thereby minimizing the contribution of the air shear force to the power consumption of the spindle motor.

17. A system as claimed in claim 16, wherein the determining means determines the current delivered to the spindle motor at each of the plurality of data storage disk locations.

18. A system as claimed in claim 16, wherein:

the system for storing data comprises an actuator motor for moving the actuator; and the power consumption parameter is indicative of the power consumed by the spindle motor and actuator motor at each of the plurality of data storage disk locations.

19. A system as claimed in claim 16, wherein the spindle motor is adapted to rotate the data storage disk at speeds greater than 5,000 revolutions per minute.

20. A system as claimed in claim 16, wherein the circuit for minimizing spindle motor power consumption further includes reestablishing means for reestablishing a target data storage disk location during a period of actuator idleness.

* * * * *